United States Patent [19]

Weman

[11] 4,216,922
[45] Aug. 12, 1980

[54] DEVICE FOR REDUCING SPRING TENSION IN A BELT STRAP

[75] Inventor: Per O. Weman, Heverlee, Belgium

[73] Assignee: N.V. Klippan S.A., Heverlee-Leuven, Belgium

[21] Appl. No.: 923,603

[22] Filed: Jul. 11, 1978

[30] Foreign Application Priority Data

Jul. 21, 1977 [DE] Fed. Rep. of Germany ....... 2732876

[51] Int. Cl.$^2$ ...................... A02B 35/02; B65H 75/48
[52] U.S. Cl. ............................... 242/107; 242/107.4 R
[58] Field of Search ............................ 242/107–107.7; 297/388; 280/801–808

[56] References Cited

U.S. PATENT DOCUMENTS 4,108,393  8/1978  Henderson ................ 242/107.4 R X
4,125,231  11/1978  Henderson ................ 242/107.4 R X Primary Examiner—John M. Jillions
Attorney, Agent, or Firm—Roger H. Criss

[57] ABSTRACT

In a device for reducing spring tension in a belt strap, particularly in a belt retractor for safety belts in motor vehicles, comprising a winding shaft and a return spring secured in a housing, the device including means for producing a force acting against the tension of the spring, the means being couplable with the winding shaft through a coupling means, the improvement comprising a spring housing mounted so as to be freely rotatable on the shaft, a pivot bearing of a wheel rotatably disposed on the spring housing, the wheel being in driving arrangement through the coupling means with the winding shaft and with the retractor housing, and a release member operable for releasing the coupling means.

19 Claims, 14 Drawing Figures

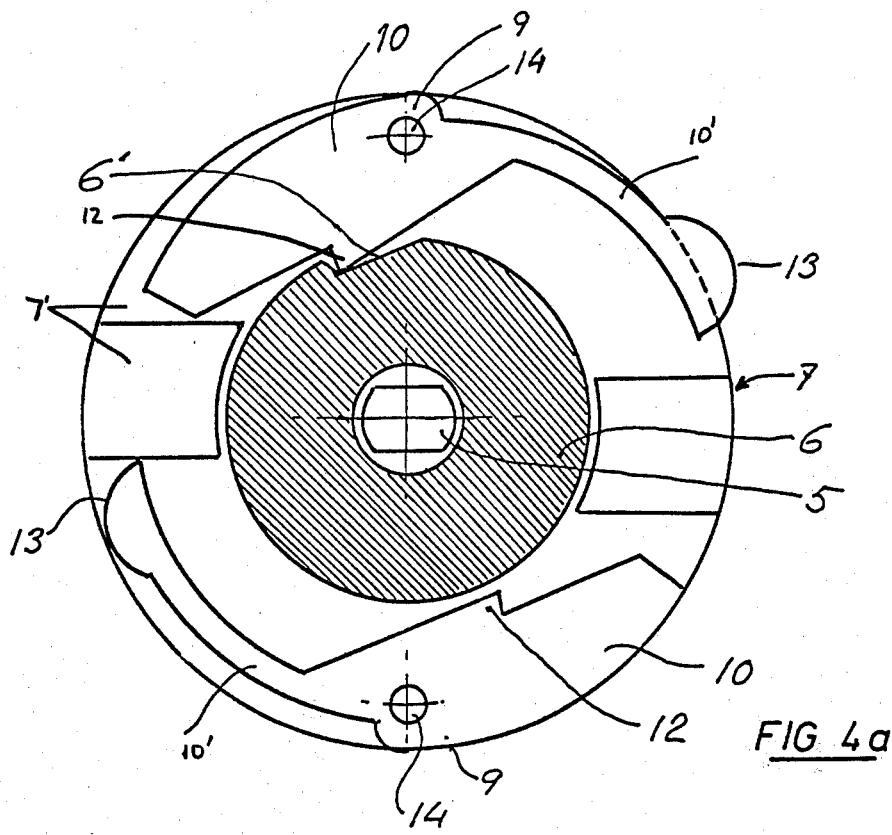

DEVICE FOR REDUCING SPRING TENSION IN A BELT STRAP

BACKGROUND OF THE INVENTION

1. Field of the Invention

The invention relates to a device for reducing spring tension in the belt strap, particularly in a belt retractor for safety belts in motor vehicles, comprising a winding shaft and a return spring secured in a housing, said device comprising means for producing a force acting against the spring tension, said means being couplable with the winding shaft through a flywheel clutch.

2. Description of the Prior Art

Most modern safety belts are currently equipped with an automatic belt retractor which with the aid of a return spring makes it possible to roll a previously withdrawn belt strap onto a winding shaft equipped with a locking device. In the event of an accident, the winding shaft is blocked or locked by the locking device and, as a result, further withdrawal of the strap is prevented and the strapped-in vehicle occupant is safely retained in his seat.

Automatic belt retractors and other belt-retracting devices are naturally subject to internal friction. This friction results in a force differential between the withdrawing force, on the one hand, and the return force, on the other, said forces acting in the belt strap. Because of this force differential, a greater force is needed to withdraw the strap, i.e., a greater force is acting in the strap, when the strap is retracted and wound up. This force differential is particularly evident or pronounced in three-point belts for which in most cases, a D-ring is provided on top of the door post in the middle of the vehicle, because additional frictional forces must be overcome in this ring. A prerequisite for a properly actuatable belt retractor is that the retracting force of the return spring be sufficient to pull up the strap and the tongue provided thereon, after the belt has been unbuckled, and to take up the slack of the unbuckled strap onto the winding shaft. On the other hand, however, in such an arrangement the return spring exerts undesirable tension particularly on the shoulder of the buckled car occupant which, because of the minimal retracting force available, is frequently annoying. Complaints about this phenomenon are voiced, in particular, after long trips.

Spring tension is always minimized. Because of the weight of the strap tongue and the need for proper, fast retraction after the belt is unbuckled, however, the return spring exerts a force of about 15 newtons at the end of the withdrawing movement.

It should be noted that the annoying return spring tension in the strap is not the retracting or winding force but the withdrawing force. For example, breathing of the vehicle occupant causes a portion of the strap to be periodically withdrawn from the retractor and then again retracted over a long period of time. Even this slight movement can, over a long period, produce an unbearable pressure on the occupant's shoulder.

Several approaches to the prevention of this problem have been considered:

A very long spring could be employed. In this case, the withdrawing force acting in the strap could for a nearly completely withdrawn strap be reduced below the 15 N level of conventional springs. The drawback of this solution is that such a long spring requires a lot of space which in common belt retractors is not available. Moreover, such a spring would be very expensive.

Attempting to minimize friction in the retractor is also very costly because of the expensive construction involved. Moreover, the normally used D-ring would then be very bulky, and since this ring is mounted near the occupant's head, it would also be very dangerous.

Other expensive and, because of excessive size sometimes impossible, solutions include the use of a gear box and the installation of a counterspring; even the use of a brake is disadvantageous. The purpose of all these proposals and solutions is to reduce the force acting in the strap.

In contrast to the other proposals, a device of the aforementioned type is known in which there is only one spring, namely the return spring on the belt retractor, but in which a brack band positioned around the periphery of an external member of a freely turning ball acts as a brake. This brake, which with the aid of a clutch acts only in one direction, however, has the drawback that it acts over practically the entire length of the withdrawn strap. In other words, when the winding shaft turns in the winding direction, the known device restrains the force of the return spring, i.e., it acts against it. This, however, occurs over the entire strap length, i.e., over the entire withdrawing or wind-up length. The resulting drawback is that the strap is not properly wound up. Because of the weight of the loosely hanging strap and of the tongue thereon, the winding action is too slow. This can also endanger the occupant's safety, for example if the occupant after leaning forward to reach the glove compartment suddenly leans back because of a critical traffic situation. In this case, the force of the return spring is not sufficient to take up the slack of the strap fast enough.

Also known are several devices wherein a secondary watch spring is used to counteract the force of the return spring. With this approach, it is possible that within limits of production tolerances the ratio of return spring force to counterspring force may not be exactly maintained, in which case the secondary counterspring could totally neutralize the action of the return spring. In this case, the strap, once withdrawn, is no longer retracted, and the existing belt slack does not protect the occupant in the event of an accident.

It would be desirable, therefore, to improve the device of the aforementioned type for reducing the spring tension in the belt strap by using, as before, only the return spring without a counterspring and yet reducing tension to a desired level, not over the entire length of the withdrawn strap but only over a desired portion of this length.

SUMMARY OF THE INVENTION

In accordance with this invention, there is provided, in a device for reducing spring tension in a belt strap, particularly in a belt retractor for safetly belts in motor vehicles, comprising a winding shaft and a return spring secured in a housing, the device including means for producing a force acting against the tension of the spring, the means being couplable with the winding shaft through a coupling means, the improvement comprising a spring housing mounted so as to be freely rotatable on the shaft, a pivot bearing of a wheel rotatably disposed on the spring housing, the wheel being in driving arrangement through the coupling means with the winding shaft and with the retractor housing, and a release member operable for releasing the coupling means.

BRIEF DESCRIPTION OF THE DRAWINGS

FIG. 4a shows a first embodiment of the clutch.

DESCRIPTION OF THE PREFERRED EMBODIMENTS

Figure 1:
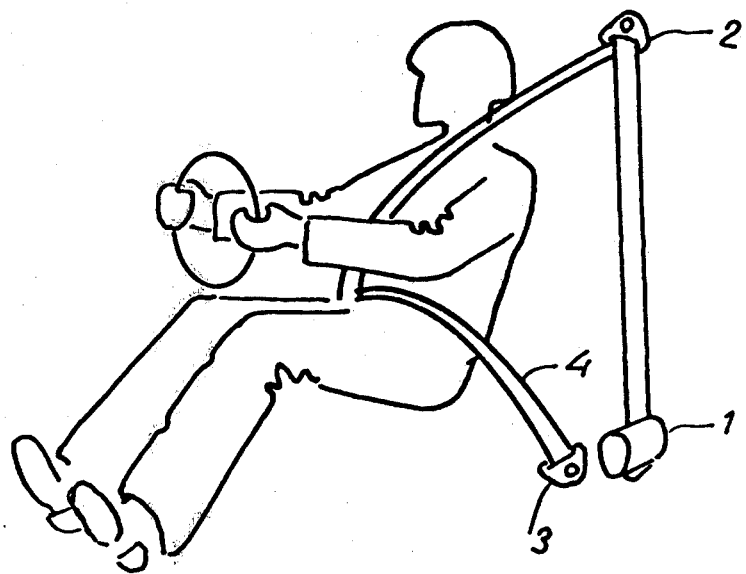
FIG. 1 is a schematic representation in perspective of a normal three-point safety belt.

According to the invention, the aforementioned problems are solved by mounting the spring housing so as to be freely rotatable and to comprise the pivot bearing of a wheel rotatably disposed on the spring housing, the wheel through the clutch being in driving engagement with the winding shaft, on the one hand, and with the retractor housing, on the other, and a release member being provided for releasing the clutch. The return spring is fixed at one end, e.g., the inner end, to the winding shaft, and at the other end, e.g., the outer end, to a spring housing. It is understood that when the strap is withdrawn, the winding shaft turns, for example, in clockwise direction so that the outer end which is fixed to the spring housing either, together with the housing, also turns in clockwise direction or it exerts a corresponding force on the stationary spring housing. This basic principle will later be used to explain the principle of the invention by referring to the drawings. It is surprising that, according to the invention, the spring housing is mounted so as to be freely rotatable, because the retracting force of the return spring can be influenced only if, in a special arrangement, the outer mounting support of the spring is moved in controlled fashion.

Moreover, the spring housing comprises a wheel rotatably disposed in relation to the housing, that is to say, whose shaft moves together with the spring housing. Moreover, on the one hand, this wheel is in driving engagement with the retractor housing and, on the other, through a clutch, with the winding shaft. It is thus possible, for the first time, to reduce the retracting force of the return spring as desired by adjusting the reduction ratio between the wheel rotatably mounted on the spring housing and the retractor housing or the winding shaft.

According to the invention, it is also particularly advantageous to provide a release member for the release of the clutch. This, surprisingly, causes the reduction of the retracting force of the return spring, namely the reduction of the spring tension in the belt strap, to occur only over a desired range of strap length, the reason being that when the desired length is exceeded, the clutch is released and as a result, the full retracting force of the return spring once again acts in the strap.

For the user, the device of the invention means that, for a small length of the strap amounting, for example, to form 70 to 100 mm measured from any point on the withdrawn strap, he can freely breath in and out or make other small movements either in the sitting position or while leaning forward without feeling the annoying pressure exerted on his shoulder by the spring tension in the strap. And yet, at the instant when the occupant, after leaning forward toward the glove compartment or the like, suddenly leans back in the seat or unbuckles the belt, the full retracting force of the return spring is restored and the strap is rapidly retracted into the retractor as desired.

According to the invention, it is possible, as in the past, to use only the return spring—without a counterspring—and yet to reduce the retracting force of the return spring within desired limits to, for example, 70%, 50% or 30% of the normally acting retracting force, and this, in particular, only for a desired length—and not during the entire wind-up process.

The last-cited feature, the advantage of which is achieved by releasing the clutch, can be explained by way of the following example. A typical effective strap length may be, for example, 30 to 100 mm. Assuming the occupant has a body of average build, it can be determined how far the unreeled strap will be from the winding sshaft when the belt is buckled. If one withdraws the strap an additional 30 or 100 mm and the strap can again be retracted, one finds, for example, that this requires one-half turn of the winding shaft. (Other examples may involve different angles). Hence, the release member will be arranged so as to release the clutch after each one-half turn because after each one-half turn the required "tension-reducing" has been covered over which, for comfort or ease of movement, the spring force is reduced to a fraction of the original retracting force. The clutch and thus the device for reducing spring tension is then released restoring the full retracting force of the return spring in the belt strap.

In a preferred embodiment of the invention, the release member is disposed on the retractor housing and, by the rotation of the clutch, can be brought into engagement with at least one cam control surface for the purpose of releasing the clutch. The clutch is provided with cam control surfaces in any suitable manner so that when the surfaces reach the release member, the clutch is automatically released.

In another embodiment, the release member is a thread on the winding shaft, and a spring lock washer is provided on the winding shaft to fix the clutch, which is formed with a disc, relative to an axially movable force transmission member. Whereas, based on initial tests, the aforementioned embodiment comprising cam control surfaces is the preferred embodiment, according to this other embodiment, clutch release is achieved when the force transmission member, which in the operation of the device of the invention transmits a part, namely the desired fraction, of the counterforce by which the return spring force is to be reduced from the rotating wheel disposed on the spring housing through the clutch to the winding shaft, is caused by the thread on the winding shaft to move axially with respect to the clutch comprising the disc and is thereby released from said clutch.

It is also advantageous, according to the invention, if the force transmission member is a grip disc rotatably disposed on the winding shaft having at the periphery thereof at least one recess and a driving ring in driving engagement with the wheel that is rotatably disposed on the spring housing, and if the clutch has a circular member with at least one projection capable of entering into the recess on the grip disc. The recess on the grip disc may be, for example, a notch capable of receiving a tooth-shaped projection of the clutch. Preferably, the notch or the tooth has a steep side and, opposite to it, a relatively flat side so that the clutch acts in only one direction. This direction is the winding direction of the winding shaft in which, as a result of the positive engagement of the clutch, spring tension is reduced whereas when the belt is withdrawn the full retracting force of the return spring must be overcome. In other words, the tension-relieving segment in both the winding and the unwinding direction begins only at the instant at which the device of the invention is actuated by even the slightest amount of winding; and even then, spring tension is reduced only over the short force-relieving segment which, for example, is from 70 to 80 mm long.

In another embodiment of the invention, the circular member of the clutch takes the form of a disc and is provided near the periphery thereof with at least one rotatable rocking lever the lighter part of which comprises externally, on one side of the pivot bearing, a cam control surface and the heavy part of which comprises internally, on the other side of the pivot bearing, a projection. Depending on the length of the tension-relieving segment desired, the peripheral locking levers can be disposed at different angles to, and at a distance from, each other. The smaller the tension-relieving segment is to be, the greater must be the number of rocking levers, i.e., release members. Both in this embodiment with rocking levers and in the embodiment with the slotted disc to be described below, the weight of the release member or members is selected so that the clutch engages the force transmission member, i.e., the grip disc, only when the winding is very slow whereas on fast winding, for example when the occupant has buckled the belt, and the strap is supposed to be retracted by the retractor quickly, the centrifugal force is so great that it becomes impossible for the projection on the clutch to fall into the recesses on the grip disc. This is the effect desired.

In a special embodiment, two diametrically opposite rocking levers are preferably provided.

The invention is also characterized by the fact that the circular member of the clutch is a ring mounted on a disc and provided with at least one inwardly extending projection, and that the disc has in the middle thereof a slot whose long dimension is greater than that of the winding shaft bearing the gripping surfaces. Externally, the end of the winding shaft may be provided with two or more gripping surfaces (such as a nut or a screw), to provide driving engagement with a clutch disc having a corresponding central opening such that it can be pushed over the end of the winding shaft thus being forced to turn with the shaft. Because of the disc slot being longer than the longest diameter of the winding shaft, there is sufficient clearance for the clutch disc to be moved in radial direction relative to the winding shaft. For example, on slow retraction of the strap the clutch disc will drop by gravity toward the grip disc causing the projection on the ring disposed on the clutch disc to engage the notch on the grip disc thus starting the operation of the device of the invention.

In another embodiment of the invention, the wheel disposed on the spring housing is a toothed wheel which is in meshing engagement, on the one hand, with a toothed wheel secured to the grip disc and, on the other hand, with a toothed rim member mounted on the retractor housing. Between this toothed rim member or an internally toothed segment on the retractor housing and the toothed wheel secured to the grip disc is provided the toothed wheel disposed on the spring housing. Depending on diameter or tooth size, a counterforce amounting to any fraction of the retractive force can be developed. The drawings provide a graphic numerical example.

In still another embodiment of the invention, the wheel disposed on the spring housing and a wheel secured to the grip disc take the form of pulleys, and a cord, cable or the like is stretched over the two wheels providing frictional engagement and, on the one hand, is secured to the grip disc and, on the other, to the retractor housing. This embodiment does not use teeth for force transmission but a steel cord which is placed around the wheels and provides frictional engagement. As in the embodiment described hereinbefore, here too, when the clutch projection engages the grip disc the wheel secured to the grip disc is caused to turn and as a result the wheel disposed on the rotatable spring housing, both alone and together with the spring housing, is made to turn for a small distance. During this slight rotation, the device of the invention reduces the spring tension in the strap. After the desired distance has been covered, i.e., after the winding shaft has rotated through the desired angle, the clutch is released, and the full retracting force of the return spring is restored. The tension-relieving segment thus extends only from the engagement of the clutch projection with the grip disc to the release of the clutch.

A special embodiment of the invention is characterized by the fact that the winding shaft has at its free end a thread of sufficient length so that both the clutch with the disc and the grip disc, both of which are provided in the middle thereof with a tapped hole that fits onto the winding shaft, are axially displaceable when turned.

According to the invention, it is also advantageous if the release member disposed on the retractor housing is a rotatably supported lever with angular arms, the inner surface of which can be brought into contact, respectively, with the cam control surface and the wheel disposed on the spring housing. This special embodiment is useful in that a lever with more or less angular arms can be used as desired, i.e., depending on the length of the tension-relieving segment. This lever is relatively easy to replace.

In still another embodiment of the invention, the spring housing bears a projection capable of being brought into engagement with a release member fixed on the retractor housing. This arrangement enables the spring housing to stop after it has rotated through a certain angle. This arrangement also ensures that the spring housing can turn in one or the other direction only until its projection has come in contact with the release member. This is advantageous, for example, when the effective range of the wheel on the spring housing is to be limited. In one direction, namely toward the end of the tension-relieving segment, this effective range is limited by the release of the clutch; in the other direction, according to the invention, it is limited by the fact that the retracting force of the return spring allows the spring housing and, hence, also the wheel disposed thereon to turn backward only until the projection on the spring housing has engaged the release member.

Further advantages, features and application of the present invention will become apparent from the following description referring to the accompanying drawings.

The vehicle occupant, shown in FIG. 1 as the driver, is using a 3-point safety belt whose strap 4 passes from an, for example, automatic belt retractor 1 through a D-ring 2, secured at the top of the door post, to an inner anchorage point disposed on the floor (not shown), and from there across the occupant's lap back to an outer anchorage point 3 disposed in the vehicle.

Figure 2:
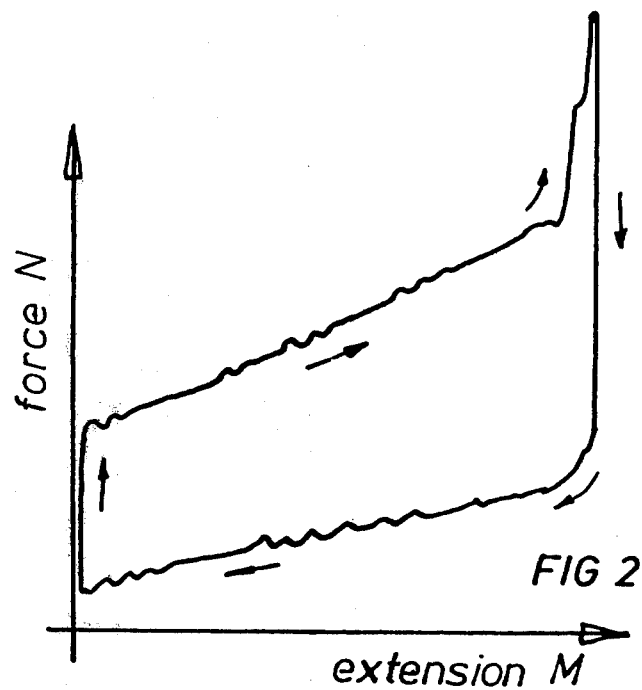
FIG. 2 shows a plot of spring tension in the strap against the length of the extended or unwound belt strap.

FIG. 2 shows a typical diagram illustrating the difference between the forces acting in the belt strap when the strap is withdrawn (top) and when it is retracted (bottom). Following the curve in the direction of the arrows starting from bottom left, at the beginning of belt withdrawal and before the strap is actually withdrawn, there is at first a sharp increase in force required to overcome the static friction in various places, for example in automatic belt retractor 1 and in D-ring 2. At the point of transition from the vertical to the inclined segment of the curve, top left, the force applied is sufficient for the strap to be withdrawn. This is represented by the inclined segment which shows that the force acting in the strap is slowly increasing. The next break in the curve, on the right where the curve turns upward, indicates that the belt is fully withdrawn, further extension of the strap system now requiring forces greater than 15 N, until the upper peak is reached. At this point, the retraction process begins. The tension in the strap is reduced along the vertical, downward oriented segment until the lower break in the curve is reached. From this point on, the tension-reducing process proceeds along the downwardly inclined segment of the curve resulting in belt retraction, i.e., until the starting point, bottom left, is again reached.

This type of curve—shown only to explain the invention—is at the base of the invention. It shows clearly the difference in force differential measured when the belt is withdrawn, on the one hand, and when it is retracted, on the other.

Figure 3:
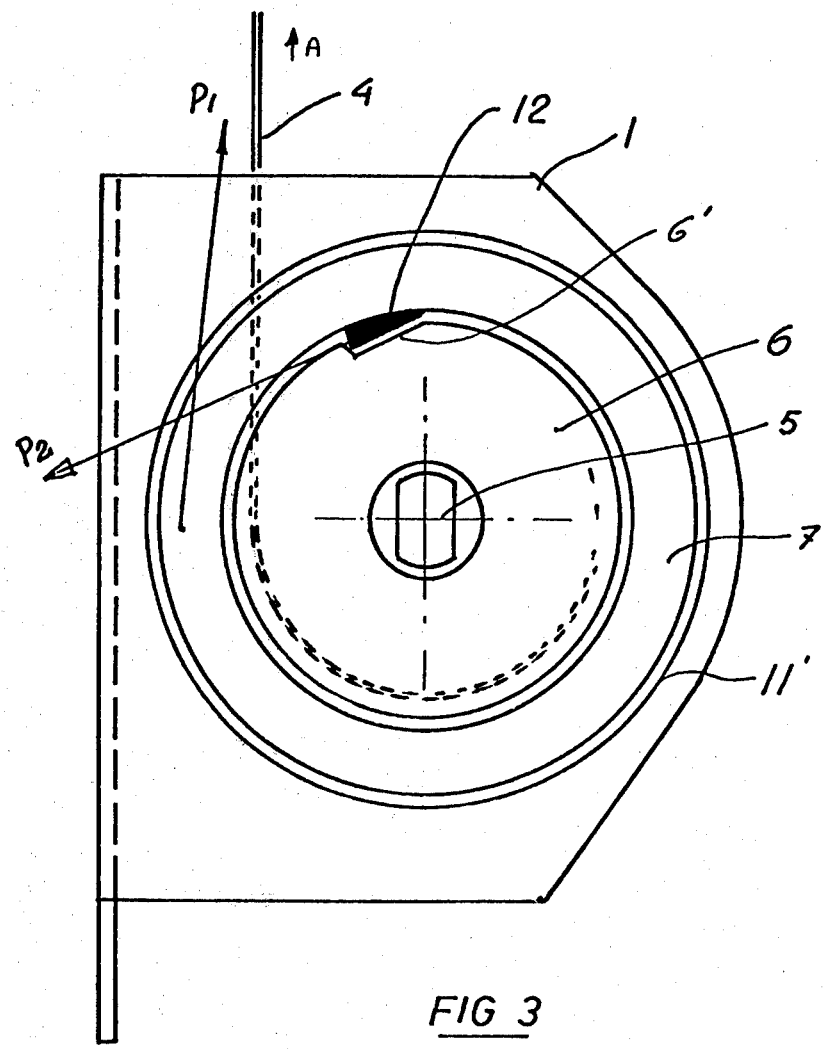
FIG. 3 is a schematic representation of the relationship among the forces acting on each other; individual parts are not shown in detail or completely.
Figure 4D:
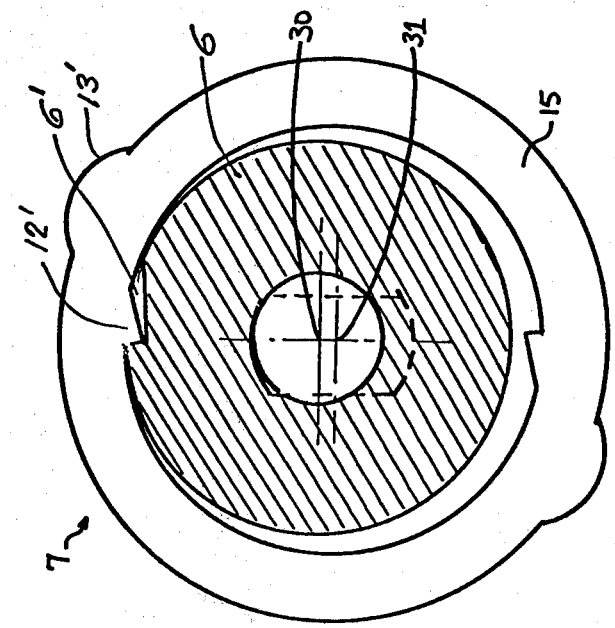
FIGS. 4b, 4c and 4d show a second embodiment of the clutch.
Figure 8A:
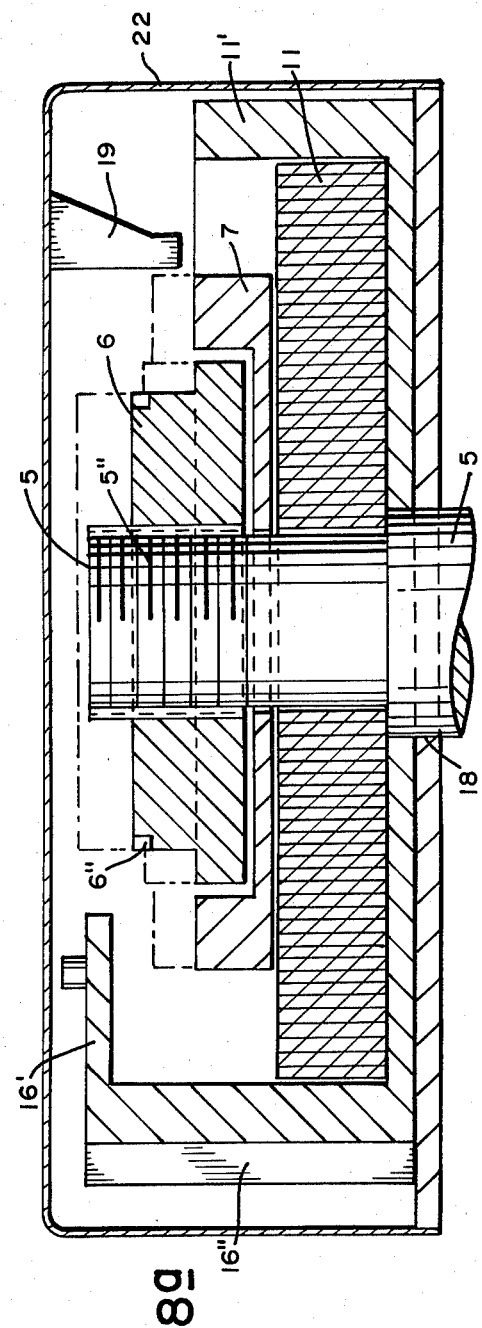
FIG. 8a shows a further embodiment of the invention in cross-sectional view similar to that shown in FIG. 5b but in which the end of the winding shaft is provided with a thread.
Figure 8B:
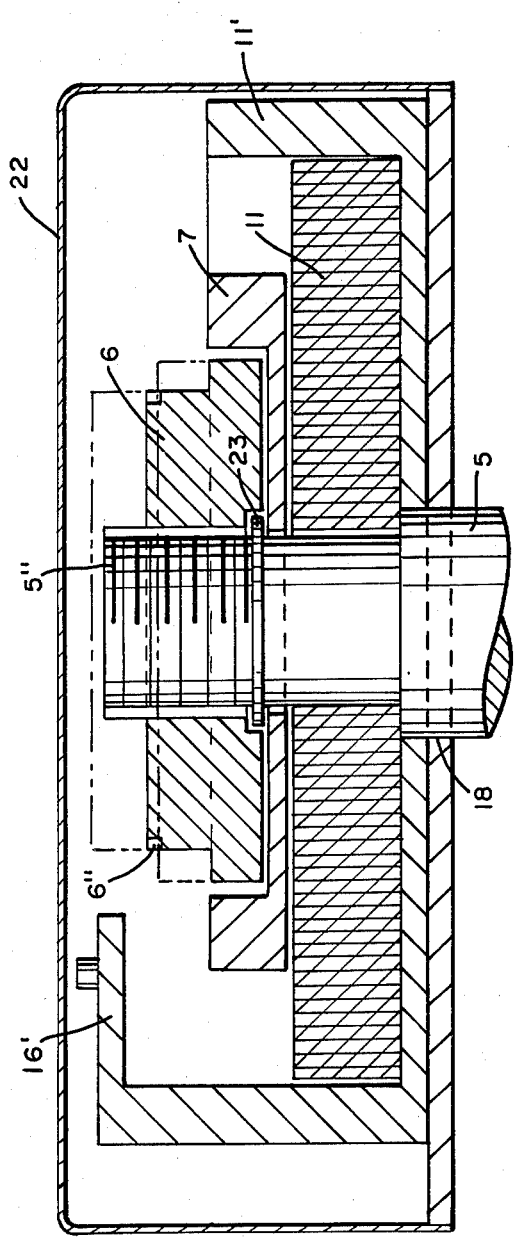
FIG. 8b is a similar representation as that in FIG. 8a, but differing from the latter in that in FIG. 8b only the grip disc, and not the combination of grip disc and clutch, is axially movable with the aid of the thread.

FIG. 3 is a schematic side view of an automatic belt retractor 1 with belt strap 4. Automatic retractor 1 has a winding shaft 5 with two gripping surfaces. A force transmission member in the form of a grip disc 6 having a notchlike recess 6' at the periphery is provided with a central opening sufficiently large to allow grip disc 6 to rotate freely relative to winding shaft 5. Behind grip disc 6, in the representation of FIG. 3, a clutch 7 is rigidly connected with winding shaft 5, the clutch having a ring disposed outside and around the grip disc. The actual clutch 7 is either represented by the embodiment of FIG. 4a or by that of FIGS. 4b to 4b. FIG. 3 merely illustrates its principle, namely the tooth-like projection 12 secured to clutch 7. Also shown, externally, is housing 11' of return spring 11 which is shown in FIGS. 5b, 8a and 8b. In a manner which is not shown, the spring is connected on the inside with winding shaft 5 and on the outside with spring housing 11'. When projection 12 engages notch 6', grip disc 6 rotates together with winding shaft 5 in counterclockwise direction.

Figure 5A:
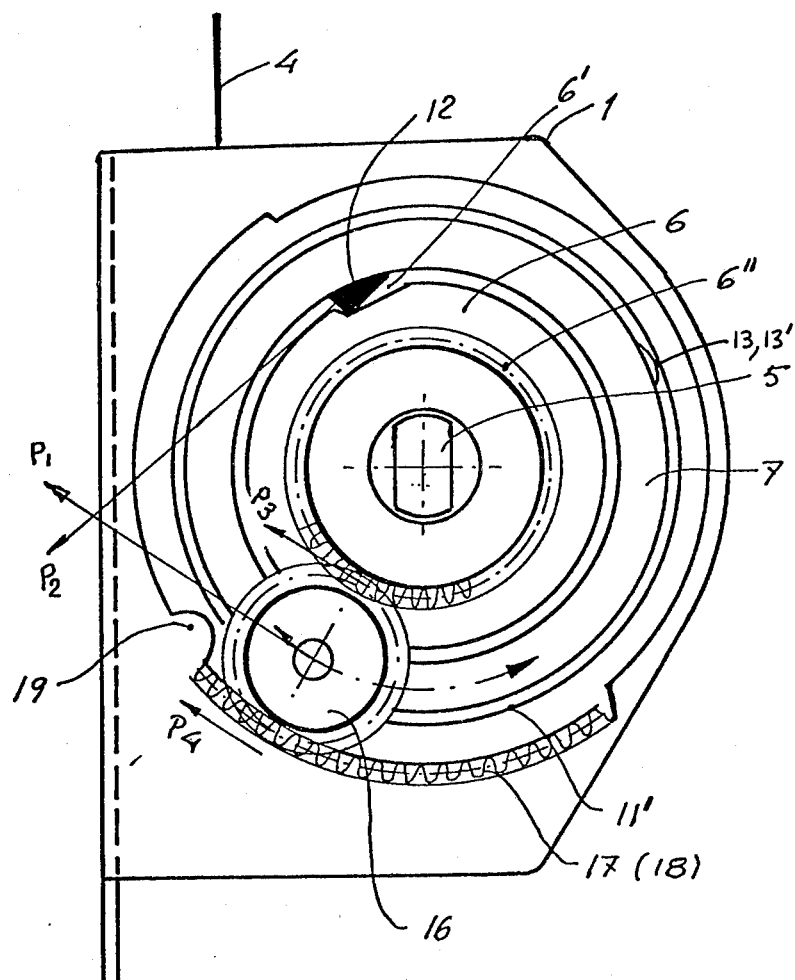
FIG. 5a is a side view of a device of the invention using toothed wheels.

When strap 4 is withdrawn in the direction of arrow A in FIG. 3, winding shaft 5 rotates in clockwise direction. This does not cause projection 12 to engage recess 6'. However, return spring 11 is thereby wound up and its end, if it were not secured to spring housing 11', would also turn in clockwise direction. Because spring housing 11' and return spring 11 whose one end is secured to the housing are held stationary, according to FIG. 3 a force $P_1$ acts in tangential direction on a desired point of spring housing 11'. Spring housing 11' is rotatably supported on winding shaft 5. Because clutch 7 is rigidly mounted on winding shaft 5 and projection 12 has engaged recess 6', the clutch transmits the full retracting force $P_2$ to grip disc 6 in a tangential direction. It is now surprisingly clear that force $P_2$ can be so oriented as to counteract force $P_1$ which spring housing 11' would develop if it were allowed to rotate in counterclockwise direction, i.e., if it were not fixed to prevent such rotation. In this theoretical case, the two forces cancel each other out. In other words, in a spring under tension or compression, each spring segment is subjected to the same force. This means that if force $P_1$ were allowed to act directly against force $P_2$, winding shaft 5 would not be subjected to any torque. The provisions of the invention are required, therefore, to divide force $P_1$, for example into forces $P_3$ and $P_4$, as shown in FIG. 5a. FIG. 5a also shows the means according to the invention, namely wheel 16 disposed on the spring housing and which in this case takes the form of a toothed wheel. According to FIG. 5a, wheel 16 divides force $P_1$ into forces $P_3$ and $P_4$ so that $P_3$, through grip disc 6, acts against force $P_2$ and force $P_4$ acts directly on the housing of belt retractor 1 (in the embodiment of FIG. 7 this occurs with the aid of pulley-type wheels 21 and steel cord 20).

Assuming that force $P_2$ represents 100% of the retracting force, the diameter and the teeth dimensions can be so chosen that force $P_3$ will amount to about 50% of the retracting force $P_2$; as a result, along the tension-relieving segment, the force felt in the strap will be reduced by 50%.

In the embodiments of FIGS. 5a and 5b, this is accomplished by the following arrangement: Winding shaft 5 is supported in part 18 of retractor housing 1. Housing 1 partly surrounds the construction parts (on the left-hand side of FIG. 5b) and is provided with an internally toothed segment or toothed rim member 17 which is also stationary. The next part which according to FIG. 5b is rotatably supported relative to winding shaft 5 is spring housing 11' with return spring 11 disposed therein. Further towards the end of winding shaft 5 is disposed nonrotatable clutch 7 or 15 and outwardly thereof is grip disc 6 which is provided with outer teeth 6". Disc 6 is in meshing engagement with toothed wheel 16 which by means of a bracket (cantilever) 16' is rotatably disposed on spring housing 11'.

Referring to FIG. 5a, a release member 19 in the form of a projection is provided on the left end side of internally toothed segment 17. Wheel 16 takes the form of a planetary wheel. In this embodiment, wheel 16 divides force $P_1$ into two equal force components $P_3$ and $P_4$ to ensure the desired effect as described hereinabove. Release member 19 ensures that the tension-relieving segment is not as long as the extended strap and that tension is relieved only within a short distance from the release point.

Figure 4B:
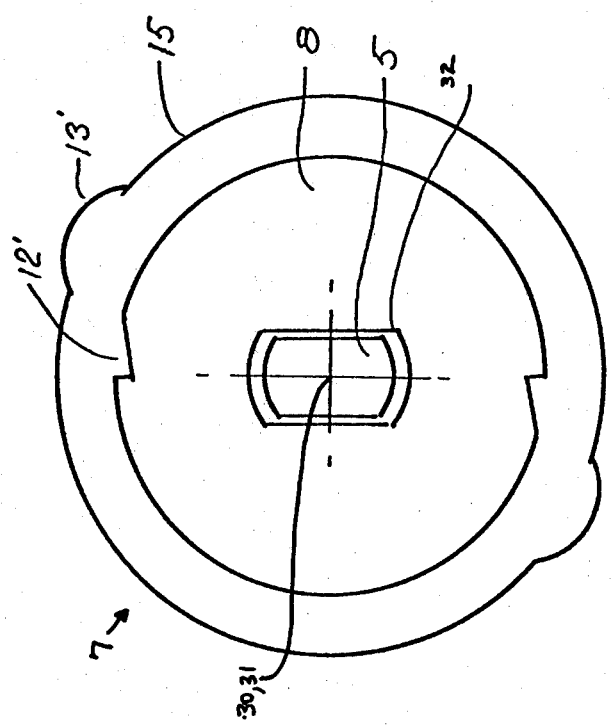
Figure 4C:
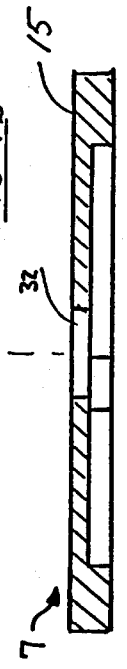
Figure 5B:
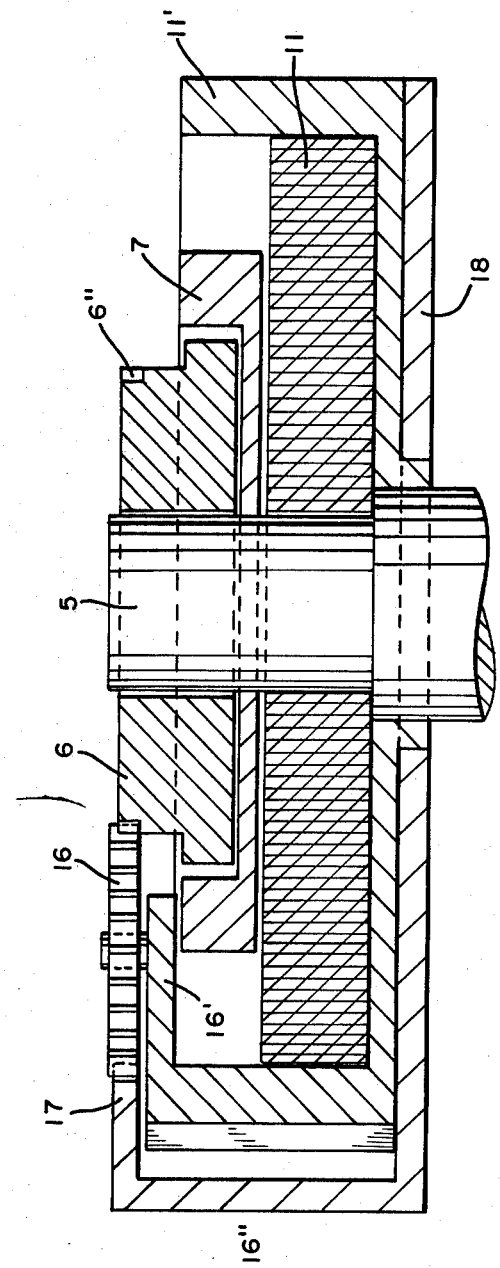
FIG. 5b is a cross-sectional view taken along a line in FIG. 5a which passes through the center of rotation of both the winding shaft and the wheel disposed on the spring housing.
Figure 6:
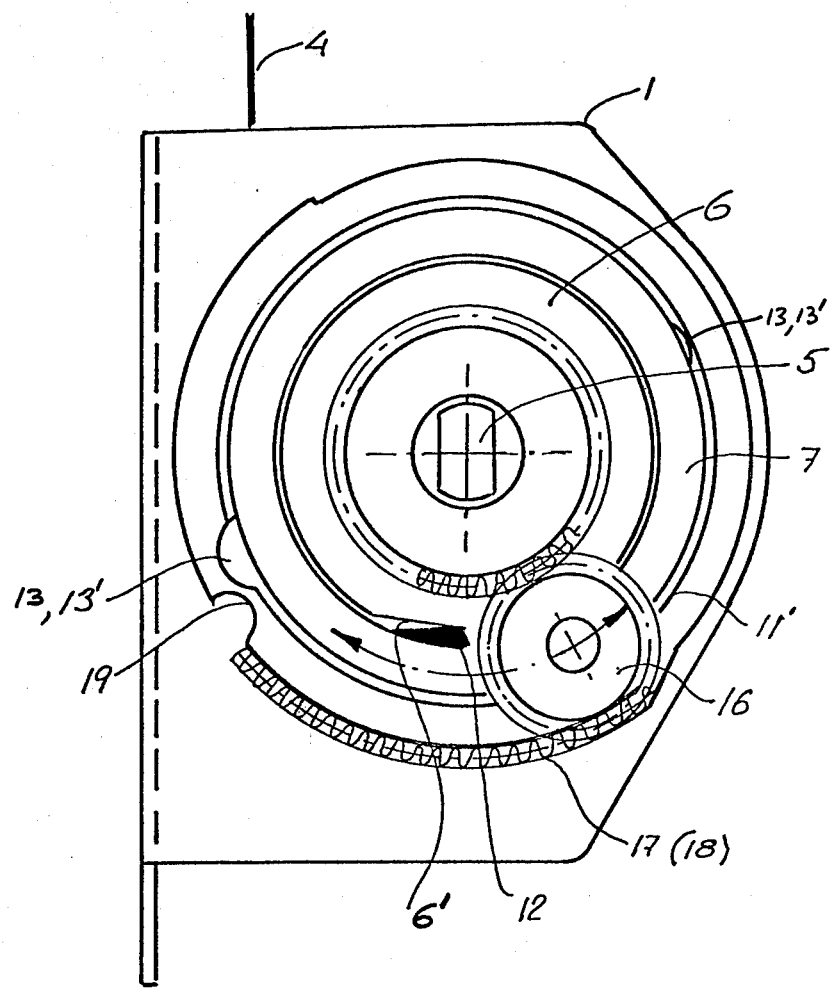
FIG. 6 is the same view and the same embodiment as shown in FIG. 5a but at a different stage of operation, namely the stage immediately preceding clutch release.

The parts that are released are the cam control surfaces 13 and 13' in the embodiment of FIGS. 4a or 4b and 4c.

According to FIG. 4a, clutch 7 has a circular part 7' in the form of a disc which at the periphery thereof has two rocking levers 9 rotatable around a pin 14. Each rocking lever 9 has on one side of pivot bearing 14 a part 10' which is lighter in terms of weight and is provided with cam control surface 13 on the outside, and on the other side of pivot bearing 14 a heavier part 10 provided with projection 12 on the inside. Grip disc 6 has a diameter such that in the area of the lower rocking lever 9 it can rotate freely on winding shaft 5 without engaging the clutch, whereas in the area of the upper rocking lever 9 it can come into driving engagement causing the force transmitted by winding shaft 5 to act on grip disc 6.

In the embodiment according to FIGS. 4b–4d, the distance between disc 6 and clutch 7 is the same as in the embodiment of FIG. 4a, but clutch 7 is provided with a circular member 15 in the form of a disc to which a ring bearing two inwardly extending projections 12' is externally secured. Clutch disc 15 has in the middle thereof a slot 32 whose long dimension is greater than that of the slot of winding shaft 5 provided with gripping surfaces. As a result, clutch disc 15 can move radially relative to winding shaft 5 and to grip disc 6. In FIG. 4b, center 30 of winding shaft 5 and grip plate 6 coincides with center 31 of clutch disc 15. This represents the released (disengaged) stage. FIG. 4d shows the coupled stage in which projection 12' lies in recess 6' providing driving engagement. Here center 31 of clutch disc 15 is disposed at a distance from center 30 of winding shaft 5 and grip plate 6 because of the drop of clutch disc 15.

Release member 19 shown in FIGS. 5a and 6 to 8a also serves as a stop for spring housing 11' which is provided with a radial projection 16'' (FIGS. 5b, 8a, 8b) which when strap 4 is withdrawn makes contact with release member 19.

In FIG. 5a, clutch 7 is just beginning to engage grip plate 6. This occurs when the seat belt is retracted from a withdrawn position. Toothed planetary wheel 16 is beginning to turn in counterclockwise direction. By the time wheel 16 has reached its end position, clutch 7 has also turned in counterclockwise direction for a distance sufficient for cam control surface 13 or 13' to rotate from the position shown in FIG. 5a into the position shown in FIG. 6 (from top right to bottom left). According to FIG. 6, release member 19 is about to come into engagement with cam control surface 13, 13'. Following this engagement, grip plate 6 is released from clutch 7 either because rocking lever 9 was turned in clockwise direction or because clutch disc 15 was pushed upward from the position shown in FIG. 4d so that, in any case, projection 12 or 12' was moved out of recess 6'. Force $P_1$ acting in the strap now immediately causes spring housing 11' to turn in clockwise direction until it touches release member 19 and comes to rest on it. Grip plate 6 now also turns, because it is in meshing engagement with toothed planetary wheel 16.

The operating cycle is now complete, and the device of the invention is ready for the next cycle. The strap can now either be wound up in unhindered fashion or, if the winding movement is very slow, it can start a new cycle for reducing spring tension in the strap.

It should be noted once again that this cycle leading to the tension-relieving segment begins only when belt retraction is slow so as to give projection 12 enough time to drop into recess 6' in grip plate 6. As stated hereinabove, on fast retraction the centrifugal force acting on the heavier half 10 of rocking lever 9 would prevent engagement of grip plate 6 with clutch 7. Thus, the full retracting force ensures the desired correct, quick retraction of strap 4.

Figure 7:
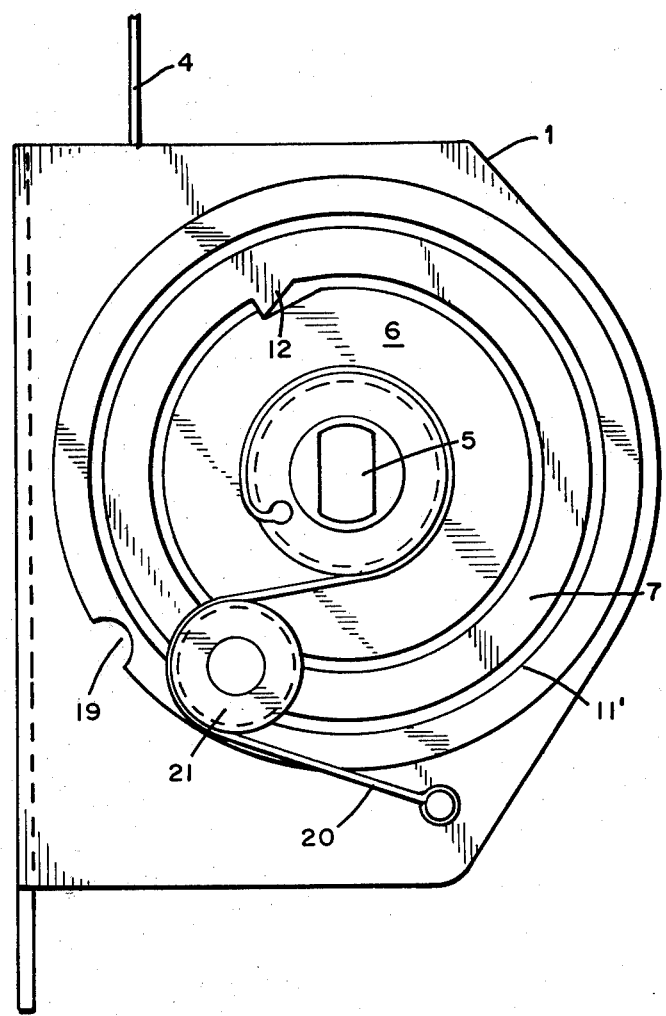
FIG. 7 is a view similar to that shown in FIGS. 5a and 6 but of a different embodiment wherein the wheels take the form of pulleys, and a belt or steel cord is placed over them.

FIG. 7 shows another embodiment wherein in place of toothed wheels, pulley-like wheels are provided on grip disc 6, on the one hand, and rotatably disposed wheel 21 is provided on the spring housing 11', on the other, with steel cord 20 placed around them. On grip plate 6, cord 20 rests on and is secured to a drum-shaped member. On the opposite end, steel cord 20 is secured to retractor housing 1. The function of this arrangement is the same as that of toothed planetary wheel 16 so that, depending on the size of the drum diameter on grip disc 6 and of wheel 21, force $P_1$ can be divided into forces $P_3$ and $P_4$ represented in FIG. 5a.

According to FIG. 8a, release member 19 constitutes a part of housing 22 enclosing the device of the invention. One can see once again bearing-shaped housing member 18 for winding shaft 5, spring housing 11' disposed thereon, return spring 11, disposed above the shaft and in the spring housing, and thread 5'' extending from there all the way to the free end of winding shaft 5. On the thread are rotatably disposed disc-shaped clutch 7 with the outer ring as well as grip disc 6 with outer thread 6'', both the clutch and the disk being rotatably movable in the axial direction on shaft 5. The dash-and-dot line indicates the position of clutch 7 and grip disc 6 in which engagement with release member 19 takes place. Although the radially disposed projection 16'' and bracket 16' for wheel 16 on spring housing 11' are shown, for clarity of illustration wheel 16 is not shown.

FIG. 8b represents an embodiment similar to that of FIG. 8a except that here axial movement of clutch 7, 15 is prevented by a spring lock washer 23. In this embodiment, only grip disc 6 can move from the position indicated by solid lines to that indicated by dash-and-dot lines. In this case, grip disc 6 is released from clutch 7 when grip disc 6 is too far removed from clutch 7 in the axial direction. Release member 19 is not needed to bring about release (i.e., to hold spring housing 11' stationary by means of projection 16'').

In operation, grip disc 6 begins to move axially when it is engaged by clutch 7. This means that the tension-relieving segment of the device of the invention can be so disposed that it also acts during several turns of winding shaft 5. In this manner, the segment which hereinabove, for example, was set at 70 mm can be extended. It is evident that there are many ways in which the length of the tension-relieving segment can be varied.

Figure 9:
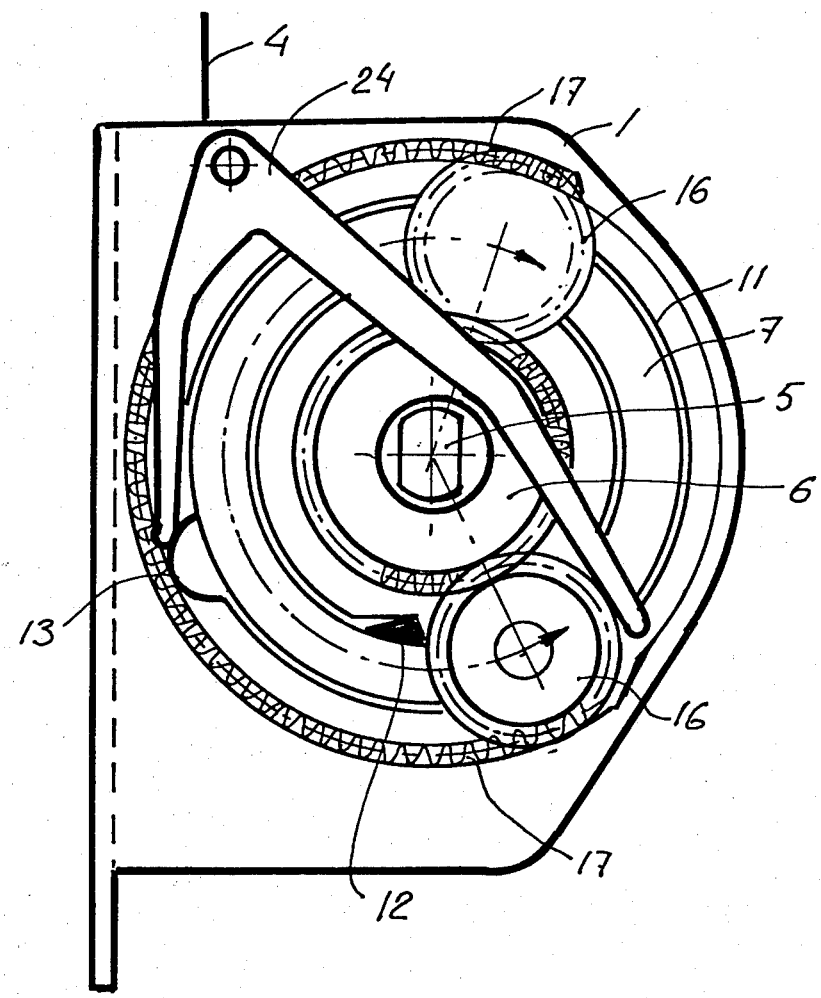
FIG. 9 shows still another embodiment of the invention in a view similar to that of FIGS. 5a, 6 and 7, but wherein a rotatably supported lever is provided as the release member.

Finally, FIG. 9 shows yet another embodiment comprising a rotatably supported lever 24 with angular arms acting as the release member. Here, too, the device of the invention functions for more than one turn of winding shaft 5, because of the relationship between toothed wheel 6" on grip disc 6 and toothed rim member 17. Here, too, a release member 19 is not needed for actuating cam control surface 13. FIG. 9 shows precisely the stage at which, on one side, cam control surface 13 comes in contact with the inner surface of one angular lever arm and, on the other side, toothed planetary wheel 16 disposed on spring housing 11' comes in contact with that of the other angular lever arm. A little later, toothed planetary wheel 16 is once again returned in the clockwise direction by the return force.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing specification.

I claim:

1. A vehicle safety belt retractor comprising:
a stationary retractor housing;
a shaft rotatably mounted in said housing about a shaft axis;
seat belt webbing adapted to be wound about said shaft;
a single rewind spring connected to said shaft and biasing said shaft in a rewind direction with a first rewind force, said rewind spring being under tension and exerting a torque acting on said housing in a belt extending direction of a first extension magnitude; and
tension relieving means actuable upon retraction of said webbing following protraction of said webbing and operable during a limited amount of additional protraction of said webbing, said tension relieving means comprising means to divide said torque acting on said housing into at least two components each having an extension force magnitude less than said first extension magnitude, said means to divide comprising a rotatable gear acting directly against said housing, and means to couple one of said lesser extension forces to said rewind spring so as to counteract the bias of said spring, thereby providing a net rewind force acting on said shaft which is lower than said first rewind force.

2. A vehicle safety belt retractor comprising:
a stationary housing;
a shaft rotatably mounted in said housing about a shaft axis;
seat belt webbing adapted to be wound about said shaft;
a spring biasing said shaft in a rewind direction;
a spring housing freely rotatable on said shaft, said spring being tensioned in response to relative rotation of said shaft and said spring housing in a protraction direction;
a wheel carried by said spring housing;
a drive member rotatable about said shaft, said wheel being in driving connection with said stationary housing and said drive member;
coupling means for drivingly connecting said drive member with said shaft; and
release means operable to release said coupling means.

3. The retractor of claim 2 wherein said drive member comprises a grip disc and said coupling means comprises a clutch disc.

4. The retractor of claim 3 wherein said grip disc has at least one peripheral recess and said clutch disc includes at least one projection which is engageable with said recess of said grip disc.

5. The retractor of claim 4 including at least one rocking lever pivotally supported for rotation about a pivot axis on said grip disc and carrying said projection.

6. The retractor of claim 5 wherein said rocking lever includes a heavier part on one side of its pivot axis and a lighter part on the other side of said axis, said heavier part carrying said projection.

7. The retractor of claim 6 wherein said release means comprises a release contact surface on said lighter part of said rocking lever and a release member disposed on said stationary housing, said release contact surface being brought into engagement with said release member upon rotation of said clutch disc, whereby said clutch disc is released.

8. The retractor of claim 7 including two rocking levers.

9. The retractor of claim 4 wherein said clutch disc is displaceable radially outwardly with respect to said grip disc and said shaft to effect engagement of said projection and said recess.

10. The retractor of claim 9 wherein said clutch disc is provided with a central opening through which said shaft extends and said grip disc is provided with a central opening through which said shaft extends, said opening of said clutch disc being greater in a radial direction than said opening of said grip disc.

11. The retractor of claim 4 wherein said release means comprises a release contact surface on said clutch plate and a release member disposed on said stationary housing, said release contact surface being brought into engagement with said release member upon rotation of said clutch disc, whereby said clutch disc is released.

12. The retractor of claim 11 wherein said release member comprises a rotatably supported lever having angular arms and inner surfaces on said arms, said release contact surface and said wheel being movable into contact with said inner surface to effect release of said clutch disc.

13. The retractor of claim 11 including a projection on said spring housing engageable with said release member to limit rotation of said spring housing.

14. The retractor of claim 3 wherein said wheel and said grip disc are in the form of toothed wheels in meshing engagement, and including a toothed rim member mounted on said stationary housing and in meshing engagement with said toothed wheel.

15. The retractor of claim 14 wherein said wheel is rotatable about an axis spaced from said shaft axis.

16. The retractor of claim 3 including a wheel secured to said grip disc and cable means extending over said wheel secured to said grip disc and said wheel carried by said spring housing providing frictional engagement between said wheels, one end of said cable means being secured to said grip disc and the other end of said cable means being secured to said stationary housing.

17. The retractor of claim 3 wherein said shaft includes a threaded portion, said clutch disc and said grip disc being axially displaceable along said threaded portion.

18. The retractor of claim 3 wherein said shaft includes a threaded portion, said grip disc being axially displaceable along said threaded portion, and lock means preventing axial displacement of said clutch disc along said threaded portion, said grip disc being released from said clutch disc in response to said axial displacement.

19. The retractor of claim 2 wherein said coupling means is effective to drivingly connect said drive member with said shaft only upon a rotational acceleration of said shaft below a predetermined rotational acceleration.

* * * * *